United States Patent [19]
Stover

[11] 3,755,741

[45] Aug. 28, 1973

[54] SELF-MONITORING OF RADIO RECEIVERS

[75] Inventor: Harris A. Stover, Cedar Rapids, Iowa

[73] Assignee: Collins Radio Company, Dallas, Tex.

[22] Filed: Feb. 11, 1972

[21] Appl. No.: 225,399

[52] U.S. Cl. .................................. 325/363, 325/364

[51] Int. Cl. .................................. H04b 1/00

[58] Field of Search .................. 325/363, 364, 2, 325/407, 67; 178/69; 343/17.7, 108

[56] References Cited

UNITED STATES PATENTS 3,273,065 9/1966 Stover .................................. 325/67

3,389,392 6/1968 Stauffer et al. .................... 343/108

*Primary Examiner*—Robert L. Griffin

*Assistant Examiner*—Marc E. Bookbinder

*Attorney*—Richard W. Anderson et al.

[57] ABSTRACT

Continuous monitoring of a radio receiver without impairing normal receiver operation is provided by an internally generated carrier signal combined at low level with the received signal. The test carrier is so modulated as to not affect normal receiver detection process, and the test modulation signal component, as present in the output of the receiver detector, is synchronously demodulated and monitored to provide indication of faulty receiver threshold level and signal distortion.

24 Claims, 6 Drawing Figures

SELF-MONITORING OF RADIO RECEIVERS

This invention relates generally to radio receiver malfunction monitoring and more particularly to a means of continuous self-monitoring on an end-to-end basis in a manner which does not interfere with normal receiver operation.

BACKGROUND OF THE INVENTION

With increased emphasis on continued readiness of radio receivers, there is a growing requirement for equipment reliability and well-planned redundancy. In order to best utilize redundancy in design and to provide effective maintenance operations, it is necessary to have a rapid and efficient method of evaluating equipment operation. In the past this evaluation has taken various forms, including monitoring of various critical voltages within the receiver and providing an alert or flag signal whenever any one of these critical voltages falls outside of a predetermined range.

The developing practice of providing "built-in test" checks receiver response to internally generated test signals. These tests are generally initiated by a radio operator or, alternatively, may be under the control of a computer and are generally conducted when the equipment is first activated, during periods when it is not performing a useful function, or at times when the operator suspects a malfunction and is looking for verification of same.

A weakness of known monitoring approaches is the inherent requirement for the test to be initiated by an operator or under the control of a computer. Further, known tests render the receiver incapable of performing its normal receiving functions during the test period. Thus, where receivers are on critical standby basis, the initiation of tests which must be performed by interrupting the normal receiver operation may critically impair vital communications.

GENERAL OBJECT OF THE INVENTION

Accordingly, the primary object of the present invention is the provision of monitoring means for radio receivers by means of which operation may be continuously evaluated during normal operation.

A further object of the present invention is the provision for monitoring receiver operation on a continual basis without interference with normal operation such that the capability of passing a received signal through the entire receiver may be evaluated.

A still further object of the present invention is the provision of a continuous monitoring arrangement for a radio receiver by means of which faulty receiver frequency response (frequency distortion) may be detected and annunciated during normal receiver operation.

A still further object of the present invention is the provision of monitoring means for a receiver for continually detecting any significant amplitude and/or frequency distortion occurring within the receiver and providing such monitoring on a continual basis without interfering with normal receiver operation.

The present invention is featured in means for coupling an internally generated test pattern modulated carrier signal to the signal as received and activating a flag or other type of annunciator to indicate faulty operation without interfering with the normal receiving capabilities of the receiver, as opposed to a system which renders the receiver inoperable for its intended function during the time of operability tests.

These and other features and objects of the present invention will become apparent upon reading the following description with reference to the accompanying drawings in which:

GENERAL OPERATION OF THE INVENTION

The receiver monitoring embodiments to be described operate generally on the provision of an internally generated signal at the carrier frequency to which the receiver is tuned being modulated with a predetermined pattern on a repetitive basis, with the modulation pattern providing a synchronously detectable output the average value of which is zero. This test signal is coupled to the received signal as applied to the front end of the receiver. The signal is injected at a level considerably below the receiver noise level and synchronous demodulation means are provided which are responsive to the pattern modulation component imparted to the injected signal to determine proper receiver operation. Since the injected or "test" signal is considerably below (approximately 10 percent or less) that of the receiver noise level, normal receiver operation is not impaired by the monitoring function which continually tests receiver operation and annunciates faulty receiver operation.

Although the embodiments to be described herein specifically relate to continuous monitoring of an amplitude modulation receiver, the principles of the monitoring system are equally applicable to phase or frequency modulation receivers with but minor substitution of frequency or phase modulators and demodulators in the system instead of (or in addition to) the described AM modulators and demodulators.

DETAILED DESCRIPTION - FIG. 1

Figure 1:
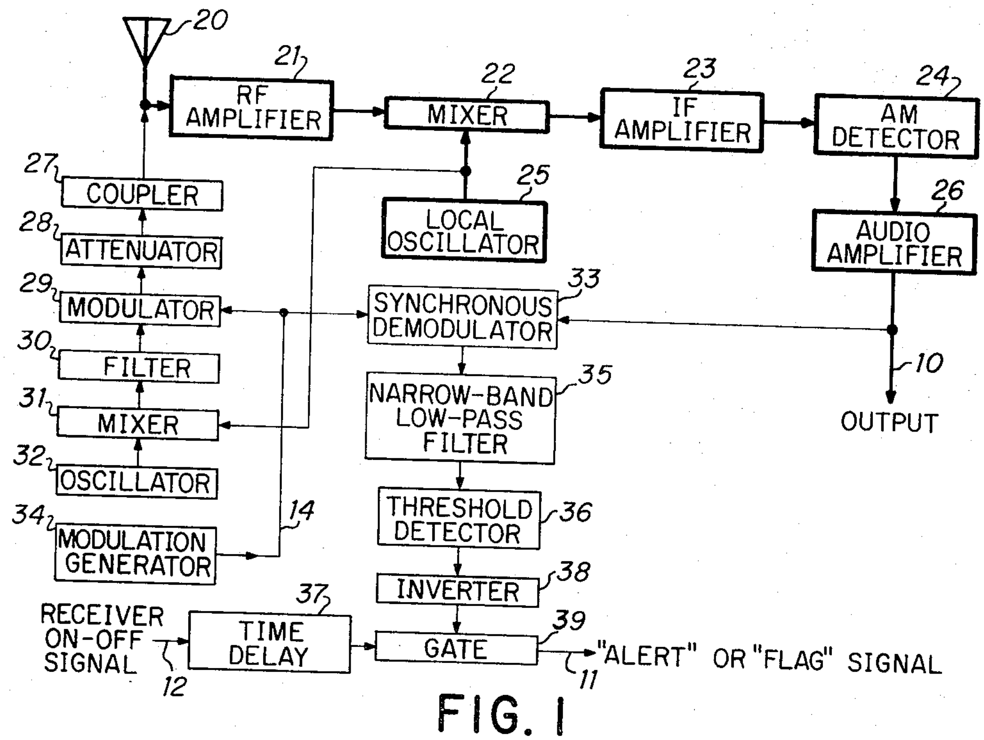
FIG. 1 is a block diagram of a continuous receiver monitoring arrangement in accordance with the present invention by means of which receiver threshold level is monitored.

A first embodiment of the present invention is depicted functionally in FIG. 1 wherein a monitoring system is added to a conventional AM receiver. Received signal on antenna 20 is applied to and amplified by RF amplifier 21. Mixer 22 and local oscillator 25 convert the frequency to that of IF amplifier 23. The output of the IF amplifier is applied to AM detector 24. Detector 24 provides an output which, after amplification by audio amplifier 26, comprises the information output signal 10 from the receiver. Thus, elements 20 – 26 comprise a conventional AM receiver (depicted in heavy outline). The additional elements in FIG. 1, and the manner in which they coact with the conventional AM receiver, constitute the monitoring means in accordance with the present invention.

Superheterodyne receivers (as depicted by elements 20–26 of FIG. 1) utilize local oscillators to convert the input carrier frequency to a particular IF amplifier frequency. In either multichannel or continuously tuned receivers, the local oscillator frequency is caused to track the desired input frequency as the receiver is tuned, and the intermediate frequency (or at least one intermediate frequency of a multiple superheterodyne receiver) remains constant. In accordance with the present invention the output of the local oscillator 25 is additionally mixed with the output of a further carrier wave oscillator 32 in mixer 31. Thus, if oscillator 32 is caused to track the receiver injection oscillator 25 so as to be in excess of the frequency to which the receiver is tuned by the injection oscillator frequency, the output from mixer 31 will contain a signal component corresponding to the carrier frequency of the desired signal to which the receiver is tuned. Likewise, if oscillator 32 is caused to be less than the frequency to which the receiver is tuned by the injection oscillator frequency, the output from mixer 31 will contain a signal component corresponding to the carrier frequency. Filter 30 receives the output from mixer 31 and selects the proper carrier frequency signal component while rejecting unwanted products from mixer 31. The signal at the output of filter 30, which is always at the frequency of the desired received signal, is applied to a modulator 29 which, under the control of modulation generator 34, causes the internally generated carrier frequency signal to be keyed on and off in a pattern controlled by the waveform generated by modulation generator 34. The output from modulator 29 is applied to an attenuator 28 which functions to attenuate the pattern-modulated internally generated carrier signal to a level where it cannot cause noticeable interference with any received signal with which it is combined by means of coupler 27.

Oscillator 32, mixer 31, filter 30, modulator 29, and attenuator 28 would preferably be mounted in a well shielded container with isolation amplifiers on the input leads from the receiver injection oscillator 25 and the modulation generator 34 to prevent the on-frequency signal generated by these blocks from causing problems by coupling into circuits where it is not wanted.

Coupler 27 loosely couples a small amount of this signal into the antenna circuit of the receiver. The coupling is sufficiently weak that it does not significantly affect any of the existing impedance levels. Attenuator 28 and coupler 27 would be adjusted so that the level of the signal injected into the antenna system is only about 10 percent of the receiver noise level. That is, if the noise spectral density, which includes the noise figure of the amplifiers, is, for example, $5 \times 10^{-23}$ watts per hertz, and the narrowest system bandwidth, which might be determined by a filter in audio amplifier 26, is 3,000 hertz, the receiver noise level is $(5 \times 10^{-23})(3 \times 10^3) = 1.5 \times 10^{-19}$ watts. The level of the signal coupled into the antenna through coupler 27 may then be adjusted to be approximately $1.5 \times 10^{-20}$ watts so as not to interfere in any way with any usable desired signal. The above levels are by way of example, to illustrate that very little of this signal is required, with emphasis that signal levels generated by mixer 31 must be kept small. This may be accomplished by incorporating an attenuator in oscillator 32 so the signal as supplied to the mixer 31 is very small, which in turn means that the output of mixer 31 is very small. The signal may then be further attenuated by attenuator 28 and a still further reduction in signal level occurs in coupler 27 to achieve the desired low signal level coupled into the receiver RF input.

In accordance with the present invention modulation generator 34 is a two-state device which is designed to "spend the same amount of time" in each of its two states. For the purpose of preliminary discussion, it might be assumed that the modulation generator 34 comprises a square wave generator. Further discussion will emphasize the advantage of having the output from modulation generator 34 consist alternately of a short pseudo-random code and its inverse.

Assuming that oscillator 32 is inoperative and that there is a signal being received on the antenna 20, synchronous demodulator 33 to which the output from audio amplifier 26 is applied along with the pattern output from modulation generator 34, either passes the signal output of audio amplifier 26 directly through, or reverses its polarity, depending upon the state of modulation generator 34 (depending upon which of the two levels exist in modulation generator 34 at the moment). Since the signal from audio amplifier 26 is either passed directly through synchronous demodulator 33 or inverted for the same amount of time, the output from synchronous demodulator 33 will average to zero unless there is a component of modulation on the incoming signal which correlates with the square wave from modulation generator 34.

Should there be a component of modulation on the incoming signal as received by antenna 20 which correlates with the square wave from modulation generator 34, the monitoring arrangement could lend to an erroneous indication and for this reason, the employment of a short pseudo-random code and its inverse for the modulation waveform generated by modulation generator 34 (as will be further described in detail) is a preferred arrangement, since it virtually eliminates any possibility of correlation between received signal modulation components and the keying waveform from modulation generator 34.

The output from synchronous demodulator 33, which as above described will be a zero-average waveform unless there is correlation between modulation on an incoming signal and the modulator waveform, is applied to a narrowband low pass filter 35. Narrowband low pass filter 35 is selected to have a cutoff frequency lower than the lowest frequency components of the waveform from modulation generator 34. Therefore, the output of narrowband low pass filter 35 will be essentially an average of the output of synchronous demodulator 33. In the particular case where the oscillator 32 supplying the internally generated carrier signal component is inoperative, there will then be no output from low pass 35 unless there is a correlation between the modulation of an incoming signal and the waveform from modulation generator 34. Assuming then that the waveform provided by modulation generator 34 has been chosen to specifically avoid this situation, there will be no output from low pass filter 35 so long as oscillator 32 is inoperative.

Now considering the case where oscillator 32 is operative, an RF signal is introduced through coupler 27 into the RF channel of the receiver which does have an amplitude modulation component defined by modulator 29 in response to the waveform from modulation generator 34. When the resulting detected signal from audio amplifier 26 is demodulated by synchronous demodulator 33 under the control of the waveform from modulation generator 34, an output from synchronous demodulator 33 is provided which will trigger threshold detector 36 to inhibit the "alert" or "flag" voltage so long as the signal is present to indicate proper operation of the receiver.

Recalling now that the level of the locally generated modulation signal introduced into the receiver antenna circuits via coupler 27 is adjusted to be several db lower in level than the receiver noise level in the information bandwidth, the question may arise as to how a useful signal may be obtained at the output of the synchronous demodulator that is not masked by the noise. Relative bandwidths make this possible. Whereas the receiver information bandwidth might be 3,000 hertz which determines its noise bandwidth, the bandwidth of the narrow low pass filter 35 may be only 1 hertz or less, giving it a 35 db advantage over the noise in the information bandwidth. Thus, although the coupled signal from coupler 27 is well below the noise level in the information bandwidth and therefore cannot significantly degrade the information signal as provided at the output of audio amplifier 26, it does provide a good signal to noise ratio in the signal monitoring bandwidth.

Threshold detector 36 was described as generating an output when the receiver is operating correctly. A failure in the receiver will cause the output to disappear. Accordingly, to utilize the response of threshold detector 36 in a conventional flag or alert annunciator, an inverter 38 may be employed to invert the output from threshold detector 36 so that an "alert" or "flag" voltage is produced whenever the receiver is not operating properly.

To prevent nuisance alarm due to the time required for narrowband low-pass filter 35 to build up to provide a signal when the receiver is initially turned on, a time delay provision is included in the embodiment of FIG. 1. In the absence of a time delay response function, a "flag" signal would be produced at turn-on and maintained until the signal in narrow band low-pass filter 35 built up sufficiently. To prevent this possible annoyance, a receiver on-off signal 12 may be used to initiate a time delay circuit 37 which will inhibit passage of the "flag" signal from inverter 38, as applied through gate 39 to the output 11, until the signal in narrow band low-pass filter 35 has had sufficient time to build up.

DETAILED DESCRIPTION - FIG. 2

The FIG. 1 embodiment defines basic principles of a receiver self-monitoring system responsive to the threshold level of a signal passing through the entire receiver. The monitoring embodiment of FIG. 2 offers, in addition to the threshold monitoring capability of the basic FIG. 1 embodiment, provision for maintaining the proper level of the injected internally generated carrier signal when the receiver employs automatic gain control. The FIG. 2 embodiment, as will further be described, also concerns a more practical arrangement of functional blocks for controlling the injection level of the internally generated carrier signal. Since automatic gain control is commonly employed in receivers, the FIG. 2 embodiment includes provision for permitting threshold monitoring compatible with AGC. Since the system operates on threshold levels, the maintenance of a fixed level by AGC in the receiver circuitries without provision for counteraction in the injection signal path, could lead to detrimental test signal levels as concerns the receiver noise level. The injected test signal level must be well below the receiver noise level to prevent impairment of normal receiver operation.

Figure 2:
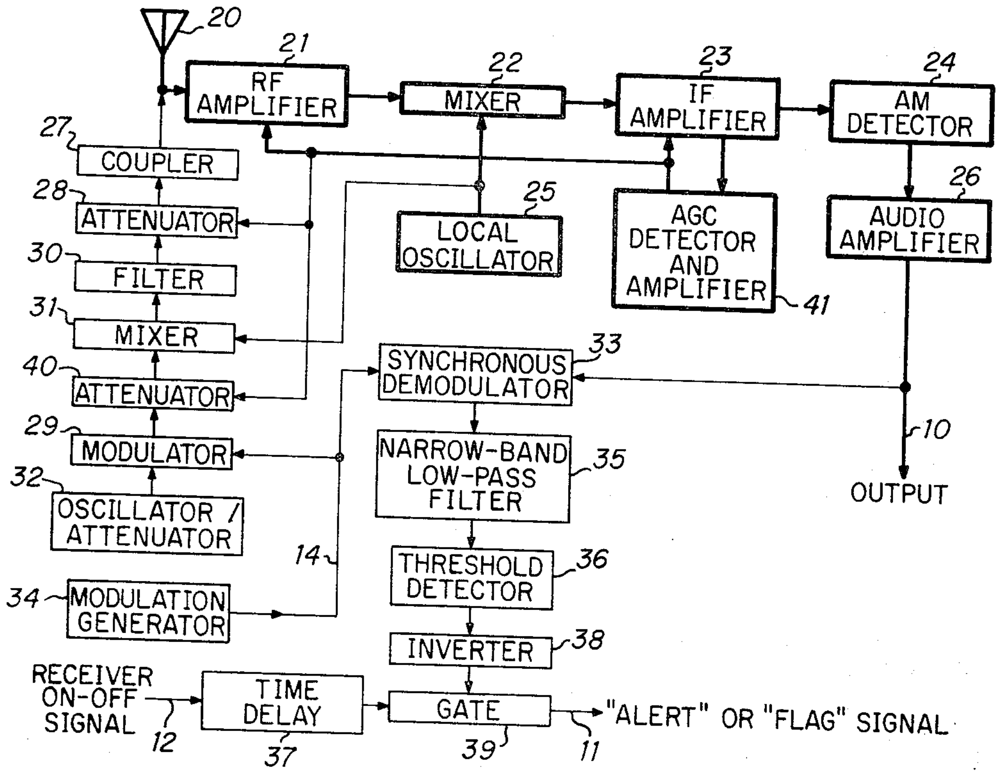
FIG. 2 is a functional block diagram of a further monitoring embodiment in accordance with the present invention with provision for automatic gain control compensation as concerns the internally generated test signal.

The embodiment of FIG. 2 consitutes a rearrangement of certain blocks in the signal path defining the generation of the test signal, together with the addition of certain blocks in that path. FIG. 2 further includes provision for monitoring receivers employing automatic gain control (AGC). With reference to FIG. 2 corresponding blocks performing like functions as concerns the FIG. 1 embodiment are like-referenced. Generally in the FIG. 2 embodiment, an attenuator is placed directly on the output of oscillator 32 to keep the output from that oscillator low as an aid in keeping it out of circuits where it is not wanted. Thus, oscillator 32 is designated as oscillator/attenuator 32 in the FIG. 2 embodiment. Modulator 29 is employed in the FIG. 2 embodiment to modulate the output of oscillator 32 rather than the output from mixer 31, as in the FIG. 1 embodiment. Since modulation rate will usually be low, it may directly key the oscillator in some applications. The signal from oscillator/attenuator 32 is quite heavily attenuated before it reaches mixer 31 by attenuator 40 in the FIG. 2 embodiment. Since there is a conversion loss in mixer 31, and since after filtering, additional attenuation is provided at the new frequency by attenuator 28, and a further decrease in level occurs due to the weak coupling provided by coupler 27 to the antenna system, the combined loss permits reduction of the injected signal below the receiver noise level in the information bandwidth.

As previously described with respect to the FIG. 1 embodiment the desired signal received on the antenna 20 is always cancelled in synchronous demodulator 33 so that it will not affect the output of the narrowband low-pass filter 35. The output of the locally generated input signal is always of the same value and will always produce the same effect at the output of narrow band low-pass filter 35 whether a received signal is present or not, so long as the system gain remains constant. However, in the situation where automatic gain control is employed, the locally generated test signal will be attenuated as it passes through the receiver prior to application to synchronous demodulator 33 and the attenuation due to AGC could reduce the injection signal level to the point where the modulation component of the injected signal as applied to synchronous demodulator 33 would give rise to a "flag" signal for strong received input signal levels to which the AGC reacts with maximum attenuation.

To compensate for the effect of AGC, the control voltage developed by AGC detector and amplifier 41 is, in addition to being conventionally supplied to the RF amplifier and IF amplifier of the receiver, applied to each of the voltage-controlled attenuators 28 and 40 in the injection signal path. As stronger signals are received, a proportionally stronger test signal is provided to compensate for the reduction in receiver gain effected by AGC. The test signal is maintained well below the received signal so that it cannot cause any significant interference while being maintained at sufficient amplitude to control the flag circuit. Sufficient ratio may be provided between the information bandwidth and the test signal bandwidth that an adequate signal-to-noise ratio will be available at the output of narrowband low-pass filter 35 to permit considerable error (15 or 20 db) in tracking between the receiver gain due to AGC and the attenuation of the test signal due to AGC.

Thus FIG. 2 differs in a preferred manner from the basic system of FIG. 1 by provision for more practical attenuation means in the injection signal path and by means controlling this attenuation as a function of receiver AGC to maintain the proper ratio between the injection signal and the desired received signal as present in the output of receiver audio amplifier 26. The arrangement of FIG. 2 permits more practical modulation means as well and, as above described, utilizes the output of the receiver AGC detector and amplifier 41 to control the attenuators in the injection signal path in addition to providing normal AGC function so that the test signal level at AM detector 24 is also relatively independent of the strength of the received signal.

The embodiment of FIG. 2, as the embodiment of FIG. 1, has been described as it applied to an AM receiver. The technique of FIG. 2, as that of FIG. 1, may equally well be applied to frequency modulation or phase modulation receivers by simply replacing the amplitude modulator 29 by an appropriate frequency modulator or phase modulator and the AM detector 24 by an appropriate FM detector or phase detector.

DETAILED DESCRIPTION - FIG. 3

Figure 3:
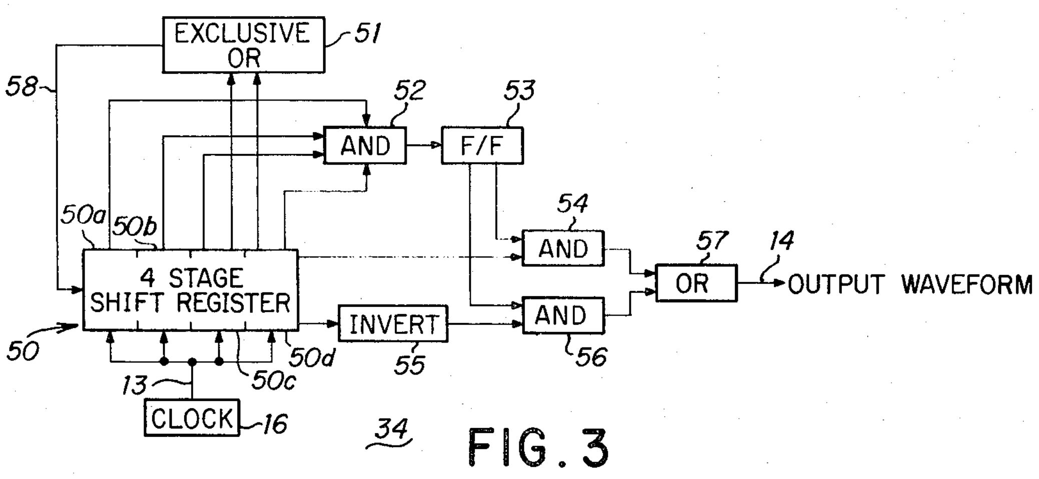
FIG. 3 is a functional block diagram of a means for generating a pseudo-random test modulation pattern for usage in the monitoring embodiments of FIG. 1 and FIG. 2.

The function of modulation generator 34 of each of the embodiments of FIGS. 1 and 2 has been defined as providing a waveform which is "on" for the same period of time that it is "off," and has been exemplified as being a simple square-wave generator. Previous discussion has mentioned, however, that the monitoring system may give rise to false flag annunciation should the modulation on the desired received signal be correlated with the signal generated by modulation generator 34. For this reason reference has been made to the desirability of utilizing a pseudo-random code modulation pattern followed by its inverse, so that the average over a period of time is zero and, due to the pseudo-random nature of the pattern, the possibility of correlation between modulating signal pattern and the modulation on any received signal would be very highly improbable. A further advantage of utilizing such a pseudo-random signal and its inverse resides in the fact that such a signal spreads the spectrum over a considerable portion of the information bandwidth. FIG. 3 functionally illustrates a method of generating a pseudo-random waveform 15 bits in length and its inverse on a repetitive basis; thus providing a repetative waveform of 30 bits.

With reference to FIG. 3, a train of periodic clock pulses 13 from a clock oscillator source 16 are used to shift the bit contents of a four-stage shift register 50 to the right (as viewed). The bit contents of the last two stages 50*c* and 50*d* of the shift register 50 are applied as respective inputs to an exclusive OR circuitry 51. The output 58 of exclusive OR circuitry 51 is applied as the input to the first stage 50*a* of shift register 50, such that the new state of the first stage 50*a* of the shift register will be a binary "zero" if, in the previous state, the last two shift register stages 50*c* and 50*d* held like bits. The new state of the first stage 50*a* of the shift register will be a binary "one" if, in the previous state, the last two shift register stages 50*c* and 50*d* held unlike bits. AND gate 52 receives outputs from each of the successive shift register stages 50*a*–50*d* and, whenever the respective outputs are all binary "one," AND gate 52 develops an output for application to flip-flop 53 to change the state of flip-flop 53. The respective complementary outputs of the two stages comprising flip-flop 53 are applied as first inputs to further AND gates 54 and 56, such that either the direct output of shift register 50, or its output as inverted by inverter 55, is applied as input to OR gate 57. Accordingly, the output of OR gate 57 is either the direct output of the last stage 50*d* of shift register 50 or the inverted output of the last stage 50*d* of shift register 50, as determined by the particular state of flip-flop 43. The output 14 from OR gate 57 is therefore alternate direct and inverted cycles of the pseudo-random sequence generated by shift register 50 and the exclusive OR circuitry 51. The modulation generator embodiment of FIG. 3 thus provides a preferred pseudo-random pattern for use in modulating the internally generated carrier signal for subsequent coupling with the desired received signal.

In operation, shift register 50 might be assumed to be initially in the state with all binary "one's" and flip-flop 43 assumed to be in the particular state that will pass the direct output from the last stage 50*d* of the shift register (as opposed to the inverted output). With these assumptions, the continuously repeated 30-bit sequence generated by the modulation generator of FIG. 3 can be determined to be as follows: "111100010011010000011101100101." Examination of the binary sequence reveals patterns of five binary "one's" in a row and five binary "zero's" in a row. Likewise the pattern contains runs of lengths three, two, and one. The five binary ones in a row result from the particular point in the sequence that was chosen for applying the inverted output from the shift register to the output line. Any other point in the sequence might be chosen for the point of inverting.

Shift register 50 normally would have the complement output of each of the four stages available. Therefore, by choosing the right combination of direct and complentary outputs as the inputs to AND gate 52, the sequence may be inverted at any desired point. Further, by using the complementary output of the last stage 50*d* of the shift register 50, inverter 55 may be omitted from the circuitry. The circuitry of FIG. 3 thus provides a pseudo-random modulation generator of a type previously described as being preferred in that the likelihood of correlation between modulation on an incoming signal to which the receiver is tuned and the particular modulation pattern provided by modulation generator 34 would be virtually nil. It might be emphasized that the above-defined 30-bit output sequence which would be continually repeated such that in addition to being pseudo-random in nature the pattern exhibits a binary one state 15 times and a binary zero state 15 times. The average of the pattern upon subsequent detection is therefore zero, a prerequisite necessary for the monitoring arrangement as previously described.

The above described FIG. 1 embodiment and its preferred counterpart of FIG. 2 provide means for monitoring the threshold level as concerns signal passage through an entire receiver in a manner that in no way interferes with normal receiver operation.

The embodiments have been described in the form of means for injecting a locally generated signal into the front end of a receiver at a sufficiently low level that it could not produce noticeable interference with the desired received signal and still permit detection of the injected signal modulation in the output of the receiver by synchronous demodulation techniques. Either sine wave or square wave modulation of the local generated signal was described as being satisfactory for the purpose intended and additional discussion emphasized the advantages of modulating the local generated signal with a zero-average pseudo-random pattern.

DETAILED DESCRIPTION - FIG. 4

Figure 4:
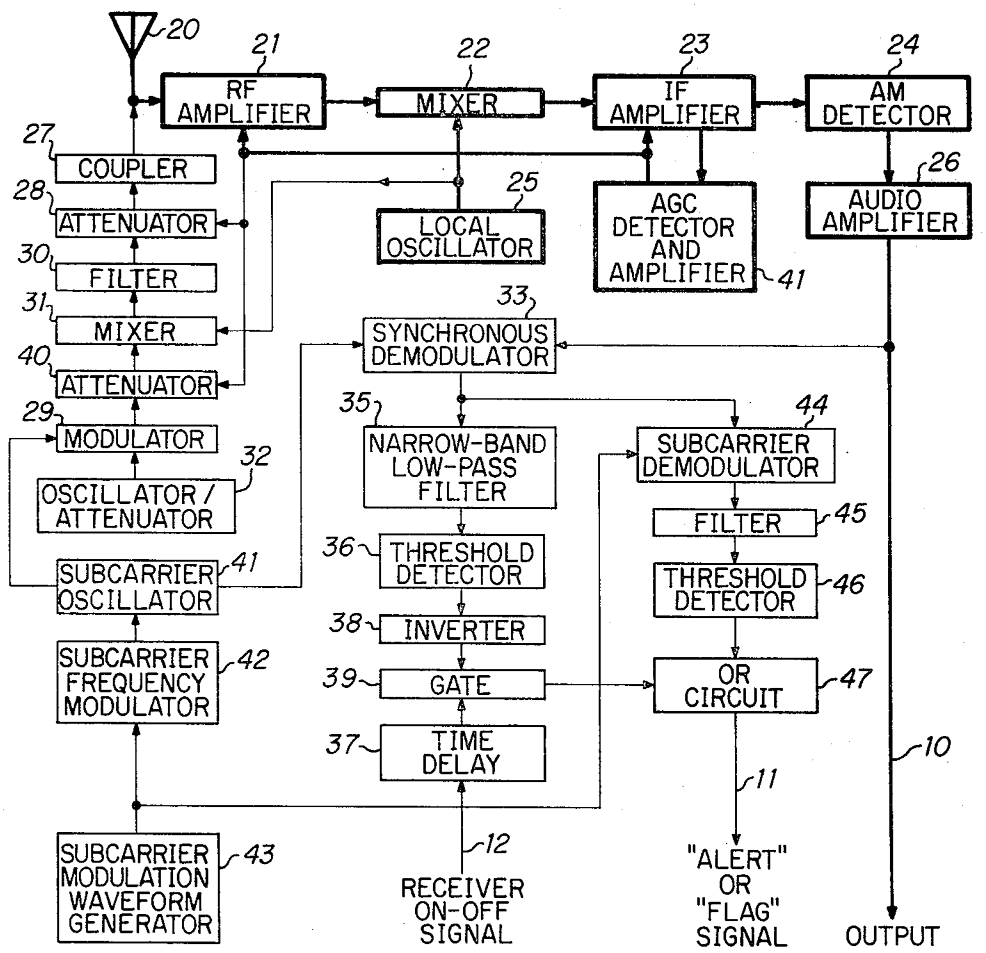
FIG. 4 is a functional block diagram of a further monitoring embodiment including means for detecting receiver frequency distortion in addition to threshold level monitoring.

Since there are conditions under which it would be desirable to monitor the frequency response of the radio receiver in addition to monitoring threshold level, the embodiment of FIG. 4 incorporates modulation of the locally generated carrier signal with a frequency-swept sine wave. The functional blocks 20 through 40 in the FIG. 4 embodiment perform previously described functions. In FIG. 4 the modulation generator which in the FIG. 2 embodiment provided a pattern modulation of the output from oscillator 32 is replaced collectively by a subcarrier oscillator 41, subcarrier frequency modulator 42, and subcarrier modulation waveform generator 43. Subcarrier modulation waveform generator 43 provides a reference waveform which determines the manner in which the subcarrier oscillator frequency is changed with time. Thus, subcarrier modulation waveform generator might comprise a simple sine wave oscillator, a triangular waveform oscillator, a sawtooth waveform oscillator, or a more complex waveform generator. The output from subcarrier oscillator 41 is applied to modulator 29 to modulate the internally generated carrier signal from oscillator 32 for subsequent coupling with the received signal. The subcarrier oscillator output is applied to synchronous demodulator 33 along with the output from receiver audio amplifier 26. Elements 35–39 perform the same function as previously described and the output from gate 39 is applied as a first input to an OR circuit 47 the output 11 of which comprises the flag or alert signal.

The output from synchronous demodulator 33 is additionally applied as an input to a subcarrier demodulator 44 which receives the output of subcarrier modulation waveform generator 43 as a second input. The output from subcarrier demodulator 44 is applied to filter 45 the output of which is applied to a threshold detector 46. Threshold detector 46 develops an output in response to a predetermined threshold input thereto and comprises a second input to OR circuit 47.

In operation, the output of synchronous demodulator 33 will have an amplitude proportional to the response of the receiver to the locally generated signal. If the receiver is not responding to the locally generated signal, a "flag" output will be produced by inverter 38 which is passed on through gate 39 and OR circuit 47. If the receiver is properly responding to the locally generated signal, threshold detector 36 will inhibit the "flag" signal from inverter 38. If the receiver is responding to the internally generated signal and there is no frequency distortion present in the receiver, the output from synchronous demodulator 33 will be constant. However, if frequency distortion is present in the receiver, there will be an AC component on the output of synchronous demodulator 33 which is related to the subcarrier modulation waveform generated by subcarrier modulation waveform generator 43. The presence of this AC component is detected by subcarrier demodulator 44, filter 45, and threshold detector 46. The "flag" output from threshold detector 46, which occurs if frequency distortion is present, is passed through OR circuit 47 to provide the output "flag" signal if frequency distortion is present. Thus, the embodiment of FIG. 4 in addition to providing a flag output when the receiver is not exhibiting a proper threshold level additionally provides a flag output when the receiver exhibits frequency distortion of a predetermined threshold severity.

As in the previously described embodiments, although the FIG. 4 monitoring arrangement has been described as relating to amplitude modulation receivers, it may be equally applicable to frequency modulation or phase modulation receiver by substituting the correct type of modulator 29 and demodulator 24 as appropriate for the type of modulation employed.

DETAILED DESCRIPTION - FIG. 5

Figure 5:
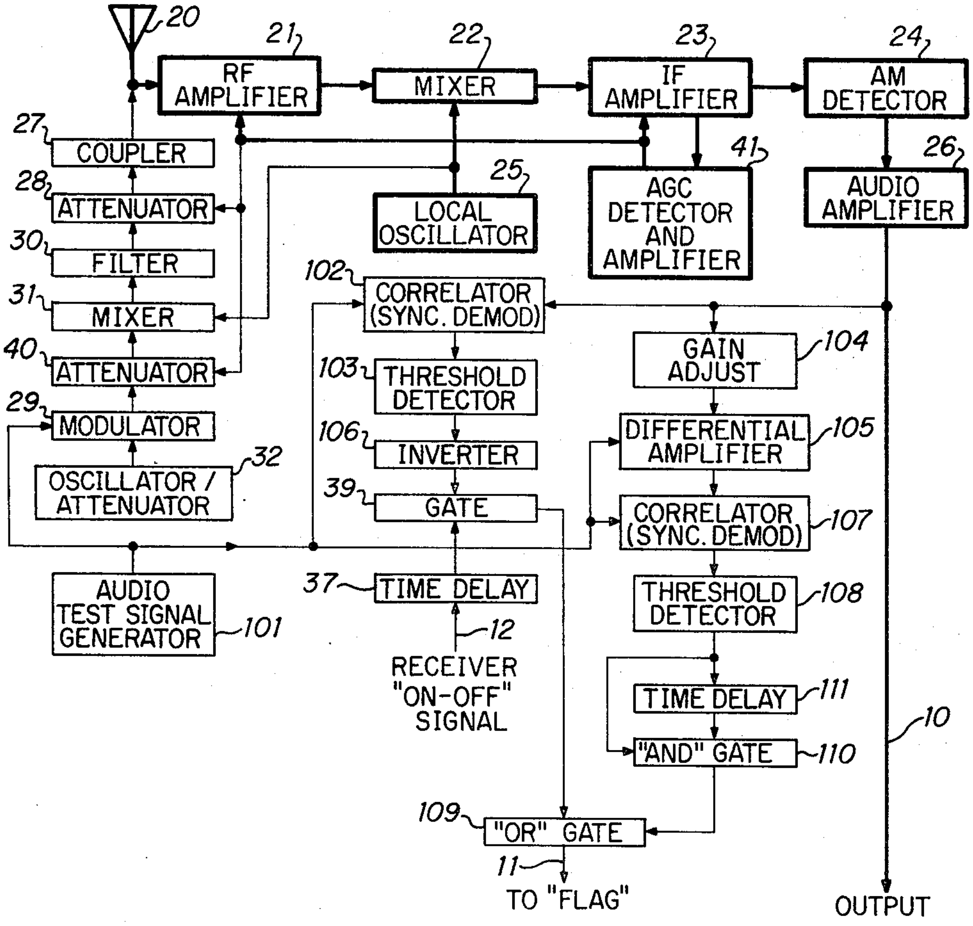
FIG. 5 is a functional block diagram of a still further embodiment of the present invention by means of which either amplitude or frequency distortion in addition to threshold level monitoring is provided.

FIG. 5 illustrates a further extension of the monitoring concept which provides means for detecting either amplitude distortion or frequency distortion that may occur in the receiver. Functional blocks 32 through 40 of FIG. 5 perform previously described functions. The significant difference in the FIG. 5 embodiment is again in the type of waveform by means of which the internally generated carrier signal from oscillator 32 is modulated. In FIG. 5, the modulating waveform applied to modulator 29 comprises the output from an audio test signal generator 101. Generator 101 may provide an audio test signal of distinctive amplitude and frequency characteristics. For example, the generator 101 may consist of a sine wave generator which is frequency modulated by another sine wave generator.

The output from audio test signal generator 101 is applied to modulator 29 at a selected low level so as to ensure a very low level of modulation of the internally generated carrier signal from oscillator 32 which, in turn, through the previously described attenuation functions is inserted at a level substantially below the receiver noise figure. As in previously described embodiments, the level of the internally generated signal as coupled to the received signal is sufficiently low as to be virtually undetectable in the receiver as concerns the audio output 10 from audio amplifier 26.

The output from audio test signal generator 101 is applied additionally to a signal correlator or synchronous demodulator 102 which receives the output from the receiver audio amplifier 26. The correlator or demodulator 102 effectively multiplies the audio amplifier output signal by the output of signal generator 101. If a low level of the test generator signal appears at the output 10 of the audio amplifier 26, there will be an output from correlator 102. If the output from correlator 102 is of sufficient magnitude, it will be detected by threshold detector 103 which will inhibit an output from inverter 106. However, if the test signal does not appear at the output 10 of audio amplifier 26, or is of insufficient amplitude, it will allow an output from inverter 106 to pass through AND gate 39 and OR gate 109 to activate the flag, thus indicating improper operation of the receiver.

To check for distortion within the receiver, the output 10 of the receiver audio amplifier 26 is additionally passed through a gain adjustment function 104 as a first input to differential amplifier 105 to which the signal from audio signal test generator 101 is additionally applied and subtracted from the audio amplifier output signal. If there is a component of the test signal from audio test signal generator 101 in the output of the gain adjust circuit 104 which is greater than the output of audio test signal generator 101, there will still be a component of the test signal in the output of differential amplifier 105. If there is a component of the test signal in the output of gain adjust circuit 104 which is less than the output of audio test signal generator 101, the negative of the test signal will appear in the output of differential amplifier 105. Therefore, if the test signal from gain adjust circuit 104 is larger than the output from test signal generator 101, there will be a positive output from correlator 107 to which the outputs from differential amplifier 105 and audio test signal generator 101 are applied as respective inputs. Conversely, if the test signal from gain adjust circuit 104 is less than the output from audio test signal generator 101, there will be a negative output from correlator 107. The gain adjust circuit 104 is adjusted such that the test signal from gain adjust circuit 104 and the output from audio test signal generator 101 are of equal amplitude and cancel in differential amplifier 105 under conditions of proper receiver operation. With this adjustment, if any significant distortion occurs within the receiver, it will prevent complete cancellation of the test signal in differential amplifier 105 and there will be either a positive or negative output from correlator 107. Threshold detector 108, which receives the output from correlator 107, provides an output whenever the positive or negative voltage from correlator 107 exceeds a selected value. When the output from correlator 107 exceeds the selected value established by threshold detector 108 longer than the period of time equal to that introduced by time delay 111, the output from threshold detector 108 will be passed by AND gate 110 to OR gate 109 and hence provide an activating output 11 to the flag.

The embodiment of FIG. 5 provides a means for activating a flag in response to receiver inadequacies as to threshold level, frequency distortion, and amplitude distortion. The embodiment, however, incorporates a necessarily critical gain adjustment of gain adjust circuitry 104.

DETAILED DESCRIPTION - FIG. 6

Figure 6:
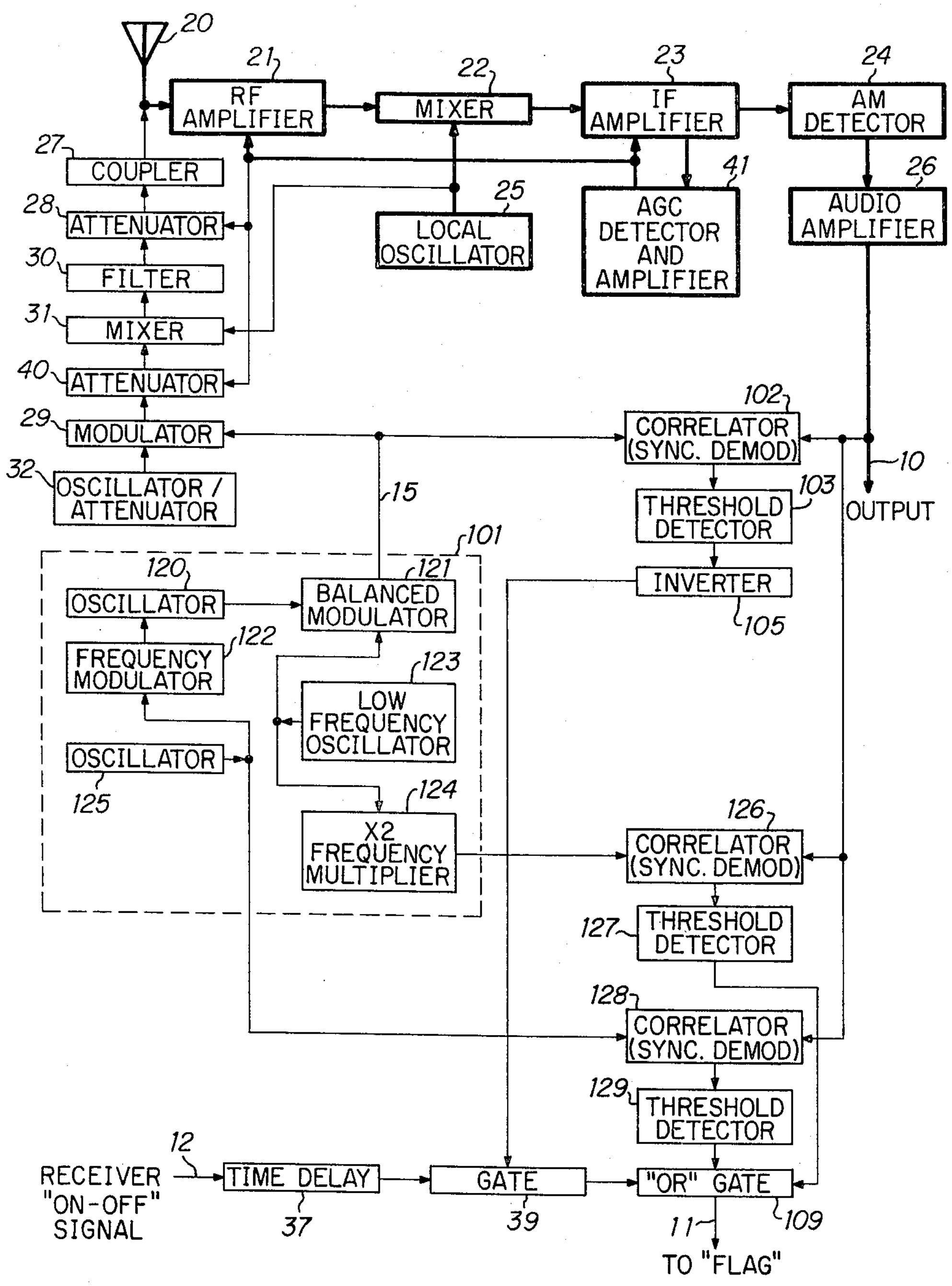
FIG. 6 is a functional block diagram of a further embodiment for receiver monitoring by means of which amplitude or frequency distortion in addition to threshold level monitoring is provided.

A related but somewhat different approach which avoids the incorporation of the critical gain adjustment of FIG. 5 is illustrated in the embodiment of FIG. 6.

With reference to FIG. 6, those functional blocks which perform functions similar to those previously described with respect to the embodiments of FIGS. 2, 4, and 5 are like referenced. The test signal, which determines the pattern by means of which the internally generated signal from oscillator 32 is modulated prior to coupling with the received signal and passage through the receiver comprises the output 15 of a balanced modulator 121. Balanced modulator 121 receives as a first input the output from an oscillator 120 which is modulated in frequency by frequency modulator 122 at a deviation rate determined by oscillator 125. The other input to balanced modulator 121 is the output of low frequency oscillator 123. Therefore, the test signal output of balanced modulator 121 consists of a pair of tones separated in frequency by twice the frequency of low frequency oscillator 123, which tones are moved together in frequency across the desired audio band at a rate determined by oscillator 125.

The presence or absence of the test modulation signal from balanced modulator 121, as it appears on the output 10 of the receiver audio amplifier 26, is detected by correlator 102 which receives the output from balanced modulator 121 and the audio amplifier output 10 as respective inputs. The operation of correlator 102 is similar in function to that of correlator 102 of the FIG. 5 embodiment and serves to provide an output 11 to the flag through OR gate 109 under the control of the receiver on-off initiated time delay 37 and AND gate 39. Threshold sensitivity is thus monitored.

The output from receiver audio amplifier 26 is additionally applied to a pair of further correlators or synchronous demodulators 126 and 128 which, in conjunction with associated threshold detectors 127 and 129, respectively, may develop annunciating outputs through OR gate 109 to the flag. Correlators 126 and 128, and their interrelationship with the test signal generator function generally designated by reference numeral 101, provide outputs if distortion is present within the receiver.

If there is amplitude distortion of a predetermined severity within the receiver, a frequency component equal to the difference frequency between the two test tones will be generated as the signal passes through the receiver. This difference frequency component will be at the frequency of the output from frequency multiplier 124 within block 101, and the output from frequency multiplier 124 is applied along with the output from the audio amplifier 26 to correlator 126 to detect this frequency component. If the amount of such distortion becomes sufficient to degrade the function of the receiver threshold detector 127 will develope an output to activate the flag through OR gate 109.

If there is frequency distortion in the receiver, the amplitude of the output of the receiver audio amplifier 26 will vary as the frequency of the internally generated carrier is varied by oscillator 125 within block 101. Since this amplitude variation will be at the same frequency as that of oscillator 125, such distortion will cause an output from correlator 128 which receives the output from the receiver audio amplifier 26 and the output from oscillator 125 as respective inputs. If the extent of this frequency distortion becomes sufficient to degrade the function of the receiver, threshold detector 129 will develope an output to activate the flag through OR gate 109.

SUMMARY

Receiver monitoring systems of a continuous end-to-end nature have thus been described which will monitor the operation of a radio receiver whenever the receiver is in operation. Monitoring means of the present invention provide a complete end-to-end monitoring of a receiver to assure that the signal properly passes through the entire receiver unit. Means have additionally been described which annunciate receiver functional degradation due to signal distortion as it passes through the receiver.

Although the present invention has been described with respect to particular embodiments thereof, it is not to be so limited. As above emphasized, the systems described herein have been defined in the environment of an amplitude modulation receiver. They may equally be applicable to frequency modulation or phase modulation receivers by the substitution of modulators and demodulators of the appropriate type for the amplitude modulators and demodulators described and illustrated. Thus, changes might be made in the present invention which fall within the scope of the invention as defined in the appended claims.

I claim:

1. In a radio receiver of the type comprising RF amplifying means receiving an input signal, an injection oscillator and signal mixer converting said received signal to an intermediate frequency signal, and signal detecting means receiving said intermediate frequency signal and detecting the modulation intelligence, means for continuously monitoring the performance of said receiver as to faulty threshold level and signal distortion without interference with normal receiver operation comprising signal generating means for generating an internal carrier signal with frequency equal that of the carrier frequency to which said receiver is tuned, means for modulating said internally generated carrier signal by a controlled pattern modulating signal the average detected amplitude of which is zero, means for combining a predetermined level of said pattern modulated internally generated carrier signal with said input signal, said level being substantially below that of the noise level of said receiver, synchronous demodulation means receiving the output of said signal detecting means and said modulating signal as respective inputs thereto, means for averaging the output of said synchronous demodulation means, and threshold sensitive annunciating means responsive to a predetermined level of the output from said means for averaging to be activated thereby.

2. Monitoring means as defined in claim 1 wherein said controlled pattern modulating signal comprises the output signal from a square wave generator.

3. Monitoring means as defined in claim 1 wherein said controlled pattern modulating signal comprises the output from a means for repetitively generating a pseudo-random bi-level signal pattern of predetermined bit length and the inverse thereof.

4. Means as defined in claim 1 wherein said modulating signal comprises an alternating current signal and means for keying said internally generated carrier signal for combination with said received signal during successive half cycles of said alternating current signal.

5. Monitoring means as defined in claim 1 wherein said modulating signal comprises the output from a subcarrier oscillator, a subcarrier modulating waveform generator, means for modulating said subcarrier oscillator output with the output from said subcarrier modulation waveform generator whereby the frequency of subcarrier oscillator varies as a function of the output waveform from said subcarrier modulation waveform generator on a repetitive pattern basis, and further comprising subcarrier demodulator means receiving the output from said synchronous demodulator and said subcarrier modulation waveform generator, a further threshold detector responsive to a predetermined output level from said subcarrier demodulation to provide an output signal, said annunciating means being further responsive to an output from said further threshold detector to be activated.

6. Means as defined in claim 5 wherein the output from said subcarrier modulator waveform generator comprises a waveform with zero average value.

7. Means as defined in claim 6 further comprising means for detecting the presence of an AC component in the output of said synchronous demodulator and means for additionally activating said annunciator in response to a predetermined threshold of said detected AC component.

8. Monitoring means as defined in claim 1 wherein said modulating signal comprises the output from an audio test signal generator, and further comprising signal gain control means receiving the output from said receiver detector, differential amplifier means receiving the output from said audio test signal generator and the output from said gain control means as respective mutually subtractive inputs thereto, further synchronous demodulator means receiving the output of said differential amplifier and the output of said audio test signal generator as respective inputs thereto, a further threshold detector receiving the output of said further synchronous demodulator means, and said annunciating means being further responsive to the output from said further threshold detector to be activated.

9. Monitoring means as defined in claim 1 wherein said modulating signal comprises the output from a balanced modulator, means for generating a first input to said balanced modulator comprising a signal source frequency modulated at a predetermined modulation rate, means generating a second input to said balanced modulator comprising a low frequency tone, said monitoring means further comprising a further synchronous demodulator receiving the output of said receiver detector and a signal at twice the frequency of said low frequency tone as respective inputs thereto, said annunciating means being additionally responsive to a predetermined threshold of the output of said further synchronous demodulator to be activated; a still further synchronous demodulator receiving the output of said receiver detector and a signal equal in frequency to the modulation rate of said frequency modulated signal source as respective inputs thereto, and said annunicating means being additionally responsive to a predetermined threshold of the output from said still further synchronous demodulator to be activated.

10. A system as defined in claim 1 wherein said means for generating said internally generated carrier signal comprises an oscillator operating at a frequency displaced from that of the carrier frequency of the signal to which said receiver is tuned by the instant frequency of said receiver injection oscillator, signal mixing means receiving the output of said oscillator and the output of said receiver injection oscillator, and filter means receiving the output of said signal mixing means and providing an output comprising said internally generated carrier signal.

11. Means for monitoring as defined in claim 10 wherein said means for combining comprises signal attenuating means operable to establish the level of the output signal from said means for combining as combined with said receiver input signal.

12. Monitoring means as defined in claim 11 wherein said receiver comprises automatic gain control means including an automatic gain control detector and amplifier the output from which is utilized to maintain a constant level input to said receiver detector with variations in received signal amplitude; said attenuator means being voltage controlled, and means for varying the attenuation effected by said attenuator means as an inverse function of said AGC voltage.

13. Monitoring means as defined in claim 12 wherein said voltage controlled attenuating means is responsive to said AGC control voltage to effect a level of said pattern modulated internally generated signal as combined with said receiver input signal so as to increase the signal level combined in proportion to increasing input signal levels and not exceeding a level substantially less than that of said receiver noise level.

14. Monitoring means as defined in claim 13 wherein said threshold detector provides an output signal of predetermined magnitude for input signal level in excess of a predetermined threshold, signal inverting means receiving the output of said threshold detector, said annunicator being activated to indicate receiver inoperability upon the output of said inverting means being below a predetermined threshold value.

15. Monitoring means as defined in claim 14 further comprising signal gating means receiving the output of said inverting means, time delay means responsive to energization of said receiver to enable said gating means a predetermined period of time after said energization, and the output of said gating means being applied to said annunciating means.

16. Monitoring means as defined in claim 15 wherein said controlled pattern modulated signal from said internal signal generating means is combined with said received signal at a level not exceeding one-tenth of the noise level of said receiver.

17. Monitoring means as defined in claim 13 wherein said controlled pattern modulating signal comprises the output signal from a square wave generator.

18. Monitoring means as defined in claim 13 wherein said controlled pattern modulating signal comprises the output from a means for repetitively generating a pseudo-random bi-level signal pattern of predetermined bit length and the inverse thereof.

19. Means as defined in claim 13 wherein said modulating signal comprises an alternating current signal and means for keying said internally generated carrier signal for combination with said received signal during successive half cycles of said alternating current signal.

20. Monitoring means as defined in claim 13 wherein said modulating signal comprises the output from a subcarrier, a subcarrier modulating waveform generator, means for modulating said subcarrier oscillator output with the output from said subcarrier modulation waveform generator whereby the frequency of subcarrier oscillator varies as a function of the output waveform from said subcarrier modulation waveform generator on a repetitive pattern basis, and further comprising subcarrier demodulator means receiving the output from said synchronous demodulator and said subcarrier modulation waveform generator, a further threshold detector responsive to a predetermined output level from said subcarrier demodulation to provide an output signal, said annunciating means being further responsive to an output from said further threshold detector to be activated.

21. Means as defined in claim 20 wherein the output from said subcarrier modulator waveform generator comprises a waveform with zero average value.

22. Means as defined in claim 21 further comprising means for detecting the presence of an AC component in the output of said synchronous demodulator and means for additionally activating said annunciator in response to a predetermined threshold of said detected AC component.

23. Monitoring means as defined in claim 13 wherein said modulating signal comprises the output from an audio test signal generator, and further comprising signal gain control means receiving the output from said receiver detector, differential amplifier means receiving the output from said audio test signal generator and the output from said gain control means as respective mutually subtractive inputs thereto, further synchronous demodulator means receiving the output of said differential amplifier and the output of said audio test signal generator as respective inputs thereto, a further threshold detector receiving the output of said further synchronous demodulator means, and said annunciating means being further responsive to the output from said further threshold detector to be activated.

24. Monitoring means as defined in claim 13 wherein said modulating signal comprises the output from a balanced modulator, means for generating a first input to said balanced modulator comprising a signal source frequency modulated at a predetermined modulation rate, means generating a second input to said balanced modulator comprising a low frequency tone, said monitoring means further comprising a further synchronous demodulator receiving the output of said receiver detector and a signal at twice the frequency of said low frequency tone as respective inputs thereto, said annunciating means being additionally responsive to a predetermined threshold of the output of said further synchronous demodulator to be activated; a still further synchronous demodulator receiving the output of said receiver detector and a signal equal in frequency to the modulation rate of said frequency modulated signal source as respective inputs thereto, and said annunciating means being additionally responsive to a predetermined threshold of the output from said still further synchronous demodulator to be activated.

* * * * *